March 13, 1962  R. V. WERNER ET AL  3,025,520
POSITIONING DETERMINING DEVICE
Filed Nov. 21, 1955  3 Sheets-Sheet 1

INVENTORS:
Robert V. Werner
BY James W. Crooks
Robert C. Weaver

Walter F. Jason
ATTORNEY

3,025,520
POSITIONING DETERMINING DEVICE
Robert V. Werner, San Diego, Robert C. Weaver, La Jolla, and James W. Crooks, Jr., San Diego, Calif., assignors to General Dynamics Corporation, San Diego, Calif., a corporation of Delaware
Filed Nov. 21, 1955, Ser. No. 548,183
18 Claims. (Cl. 343—105)

This invention relates to means for determining the position of an object in space, and particularly, to a device of this type which transmits radiant energy between the object and a plurality of predetermined reference points displaced therefrom. While the position determining device of this invention is of general application, it is particularly suitable for determining the position in space of an object such as an aircraft or missile in flight, and will be described in that connection.

Although several systems suitable for determining the position in space of an object in flight are presently available, none of these are sufficiently accurate, particularly at ranges of 150 or 200 miles, to enable location of a body with a possible maximum error of 20 feet. By way of contrast, conventional radar systems at long ranges are not capable of locating an object with an accuracy greater than a matter of miles. Other object locating systems, such as loran and shoran, may more accurately locate the position of an object in two dimensions relative to the surface of the earth, but do not provide altitude information. In addition, systems of this nature require an operator aboard the aircraft. It will be apparent, therefore, that such prior art object locating systems cannot be employed in connection with missiles, and are inconvenient for use in connection with aircraft carrying only the pilot.

The position determining system of this invention is particularly adapted for following the path of flight of pilotless aircraft or missiles. Determination of the instantaneous position of such objects in space must provide information not only of the azimuth angle and distance of the body from a reference point, but also of the elevation. From such information, the flight of the body may be continuously indicated by means of suitable indicating devices, or the path of flight may be compared with the desired flight course in a suitable automatic computer, thereby enabling suitable corrective controlling signals to be transmitted to the object.

The position determining system of this invention measures the angle between each of two mutually perpendicular intersecting base lines and a line joining the point of intersection with the object, each angle defining a surface of position in space. The line of intersection of the two surfaces defines a line of position joining the object to the ground reference point at the intersection of the base lines. Distance between the ground reference point and the object along the line of position defined by the planes is also determined, thereby definitely locating the object with respect to the ground reference point.

Angles defining the surfaces of position are determined by measuring the phase difference between the signal received from a common source by two antennas on each base line spaced a known distance apart. The phase difference between the signal received by each antenna pair is proportional to the difference in path length between each of the antennas of the pair and the source and thus varies with the angle of the line position. Distance between the reference point and the object is determined by measuring the phase delay of a modulation signal impressed upon the carrier signal. A phase delay proportional to the distance through which the wave travels, and therefore, the time delay between the transmitted and received signal is proportional to the distance between the object and the range measuring apparatus.

Each angle is measured with respect to a base line by simultaneously receiving a signal from a source in the aircraft or missile at a pair of antennas spaced a known distance apart along the base line. These angles may be determined with reference to the base lines by measuring phase differences between the signals received by a reference antenna and a fine data antenna spaced several wavelengths apart on each base line. The ambiguity of the angles determined in this manner is resolved by means of angle information furnished by the signals received by the reference antenna and an intermediate data antenna spaced closer together along the base lines. The ambiguities remaining in the intermediate angle data may then be resolved by reference to nonambiguous angle data supplied by an accurate direction finding antenna, which may preferably be of the conical scan or lobing type.

It will be apparent from the foregoing, therefore, that three grades of angle information are available for each base line, including coarse information from the direction finding antenna, supplied to both base line systems, intermediate data from a first closely spaced pair of antennas on each base line, and fine data from a second more distantly spaced pair of antennas on each base line. The three grades of angle information are supplied to an indicating system associated with each base line, wherein the coarse data from the conical scan antenna is utilized to correct ambiguities in the data supplied by the intermediate pair of antennas, and the nonambiguous corrected data from the intermediate pair of antennas is supplied to render unambiguous the data furnished by the fine data antenna pair. A servo system is provided for each base line responsive to the coarse angle data from the conical scan antenna, phase data from the pair of intermediate data antennas and phase data from the fine data antenna pair. The servo system applies the ambiguity corrections to the fine angle data in accordance with the intermediate angle data, corrects the ambiguity of the intermediate data in accordance with the coarse data, and manifests the cosine of the angle with respect to the associated base line as a count, as a shaft rotation, or as a voltage.

The distance between the object and the ground reference point is similarly determined in three steps. The phase delay of a low frequency, long wavelength, modulation signal is first measured. This rough measurement is used to resolve the ambiguities of the phase delay measurement of an intermediate, higher frequency, shorter wavelength modulation. The intermediate measurement is finally utilized to correct the ambiguity of a fine, high frequency, short wavelength modulation. As in the case of the angle measuring systems, a servo system serves to receive the phase delay data, apply the ambiguity corrections, and manifest, the range as a count, a shaft position, or a voltage.

A transmitter is provided at the ground station to transmit a radio-frequency signal at a first frequency, modulated with the three range determining signals. A transponder in the aircraft or missile retransmits the modulation signals on a second carrier frequency. The signal transmitted by the transponder is received by the pairs of angle-measuring antennas on each base line. The range measuring antenna, may conveniently be combined with one of the angle measuring antennas.

It is an object of the present invention, therefore, to provide a new and improved system for determining the position of an object in space having a very high degree of accuracy.

Another object of this invention is to provide a position determining system adapted for accurately determining the azimuth, elevation and distance of an object in flight with reference to a fixed point on the ground.

Another object of this invention is to provide an object locating system wherein the ambiguities inherent in accurate data may be resolved by means of less accurate, nonambiguous data.

Another object of this invention is to provide an object locating system wherein a line of position is determined by two intersecting surfaces defined with respect to mutually perpendicular, crossing, reference lines.

Another object of this invention is to provide an object locating system wherein the position of an object in space with respect to a reference point may be determined automatically and instantaneously, without requiring any manipulations or adjustments on the part of the operator.

Other objects and features of this invention will be apparent from the following specification and claims taken in connection with accompanying drawings, wherein:

FIGURE 10 illustrates a parallax correction computer employed in connection with the fine range channel in FIGURE 9; and, FIGURE 11 illustrates a receiver of a type which may be employed in this invention.

Figure 1:
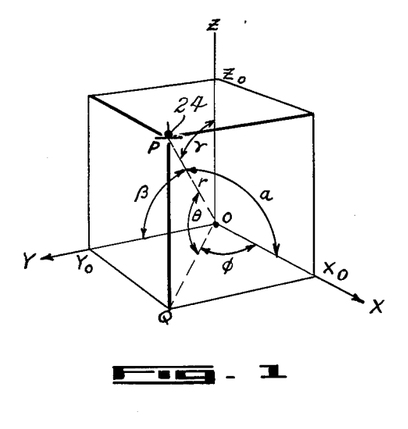
FIGURES 1 and 2 illustrate the geometric principles underlying this invention.

The geometric principles underlying this invention are illustrated by FIGURE 1. A reference point O at the ground station is determined by the crossing point of the X and Y base lines of the position determining system. The extensions of the base lines constitute the X and Y axes of a rectangular coordinate system. An object in space is at an arbitrary point. The line OP from the origin O to point P represents the radius vector or slant range $r$. The point Q represents the projection of point P on the X—Y plane, while $X_0$, $Y_0$ and $Z_0$ are the X, Y and Z rectangular coordinates, respectively, of an object at point P.

From the diagram of FIGURE 1, the X, Y and Z rectangular coordinates may be determined by the trigonometric equations (1) $X_0 = r \cos \alpha = rl$
(2) $Y_0 = r \cos \beta = rm$
(3) $Z_0 = r \cos \gamma = rn$ The numerical values of $\cos \alpha$, $\cos \beta$ and $\cos \gamma$ will be represented by the direction cosines designated $l$, $m$ and $n$ respectively.

The position determining device of this invention determines the values of $l$, $m$, and the range $r$. The value of direction cosine $n$ may then be computed by any suitable means, not forming part of this invention from the relation $$l^2 + m^2 + n^2 = 1$$

solving for $n$, (4) $n = (1 - l^2 - m^2)^{1/2}$

It will be apparent, therefore, that by determining the direction cosines $l$ and $m$, and the range $r$, the position of an object in space relative to point O may be positively determined.

Figure 2:
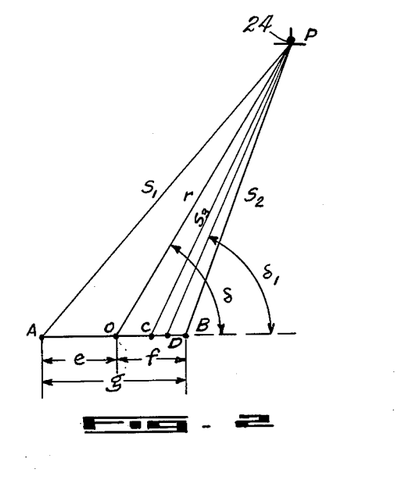

The principal by which direction cosines $l$ and $m$ are determined by this invention is illustrated by FIGURE 2. An object P transmits a continuous wave radio-frequency signal which is received by antennas at points A and B. Points A and B are equidistant from reference point O, points A, O and B lying on a straight line. The distance between point A and point O is designated by $e$, the distance between point O and point B is designated by $f$, and the distance between A and B is $g$.

Thus, $$e = f, \text{ and } e + f = g$$

The following trigonometric relations may be derived the diagram of FIGURE 2.

(6) $\quad S_1^2 = r^2 + e^2 + 2er \cos \delta$
(7) $\quad S_2^2 = r^2 + f^2 - 2fr \cos \delta$ and, $$S_1 = [(r^2) + (2er \cos \delta + e^2)]^{1/2}$$

or $$S_1 = (u_1 + v_1)^n$$
$$S_2 = [(r^2) + (-2fr \cos \delta + f^2)]^{1/2}$$

or, $$S_2 = (u_2 + v_2)^n$$

These relations may then be expanded in a binomial series:

$$S_1 = u_1^n + nu_1^{n-1}v_1 + \frac{n(n-1)u_1^{n-2}v_1^2}{2!} + \ldots$$

or, $$S_1 = r + e \cos \delta + \frac{e^2}{2r} - \frac{e^2 \cos^2 \delta}{2r} - \frac{e^3 \cos \delta}{2r^2}$$
$$- \frac{e^4}{8r^3} + \frac{e^3 \cos^3 \delta}{2r^2} + \frac{3e^4 \cos^2 \delta}{4r^3} + \ldots$$

$S_2$ may be similarly expanded. Taking the difference between $S_1$ and $S_2$ and simplifying, $$S_1 - S_2 = \cos \delta + \frac{(e-f)(1-\cos^2 \delta)}{2r}$$

(8) $\quad \dfrac{S_1 - S_2}{e+f} = \cos \delta + \dfrac{e-f}{2f}(1 - \cos^2 \delta)$ $$- \frac{(e^3 + f^3)(1 - \cos^2 \delta (\cos \delta)}{(e+f)2r^2} + \ldots$$

Since the receiving antennas at A and B are equally spaced from the reference point O, $$e = f = \frac{g}{2}$$

Substituting, Equation 8 may be reduced to $$\frac{S_1 - S_2}{g} = \cos \delta - \frac{g^2}{8r^2} \cos \delta (1 - \cos^2 \delta) + \ldots$$

however, the base line $g$ between the antennas A and B is much smaller than the range $r$. That is, $$\frac{g}{r} \ll 1$$

and, therefore, $$\frac{S_1 - S_2}{g} = \cos \delta$$

to a very close approximation.

Now, if a continuous wave radio signal $C_1 \cos \omega t$, of wave-length $\lambda$ is radiated from the object P, a signal $$C_1 \cos \left( \omega t + \frac{2\pi S_1}{\lambda} \right)$$

is received by the antenna at point A, and the signal $$C_1 \cos \left( \omega t + \frac{2\pi S_2}{\lambda} \right)$$

is received by the antenna at point B. The phase difference between the signals received at points A and B is $$\phi = \frac{2\pi(S_1 - S_2)}{\lambda}$$

and since $$\frac{S_1 - S_2}{g} = \cos \delta$$

$$\phi = \frac{2\pi g \cos \delta}{\lambda}$$

or, $$\cos \delta = \frac{\lambda}{2\pi g}\phi$$

Since wave length $\lambda$ and the distance $g$ are maintained at a constant value during operation of the system, the equation may be written as (9) $\qquad \cos \delta = K\phi$ It will be apparent from inspection of Equation 9 that the cosine of the angle $\delta$ between the reference line A—B and the line $r$ joining the reference point O, at the center of line A—B, and the object P may be determined simply by measuring the difference in phase of a radio-frequency signal transmitted by object P and received by the antennas located at points A and B.

As disclosed hereinabove, the wavelength of the radio signal is much shorter than the distance between the antennas at points A and B. As a result, many positions of object P are possible from which may be obtained identical phase difference measurements. In order to resolve the resulting ambiguity of the directional cosine, an additional phase comparing antenna is provided, located at point C on refernce line A—B and in addition, a conventional conical scan, direction finding antenna is provided at point O. The antenna at point C cooperates with the antenna at point B in a manner similar to the antenna at point A. However, the distance between points C and B is less than the distance between points A and B. Therefore, the difference in path length traversed by the signal from object P to the antenna at point C, designated $S_3$, and path length $S_2$ is less than the difference between the path lengths $S_1$ and $S_2$. As a result, the number of possible ambiguous phase difference measurements are substantially smaller although the direction cosine is less accurately determined, due to the shorter base line. In order to resolve the remaining ambiguities of direction cosine determination, a parabolic, conical scan direction finding antenna is provided at reference point O.

The conical scan direction finding antenna receives the signal transmitted from the object at point P. By means of the conical scan antenna, a nonambiguous, but relatively coarse determination of the azimuth and elevation of the object at P is obtained, and, by means of a computing network described more completely hereinbelow, the direction cosines with respect to the two base lines are obtained. The direction cosine related to base line A—B is utilized to resolve the ambiguous phase measurement of intermediate pair of antennas B—C by means of a servo system disclosed more fully hereinbelow.

After the ambiguity of the intermediate direction cosine is resolved a correction for parallax is inserted by a parallax correction computer disclosed more fully hereinbelow. The angle $\delta_1$, measured by the intermediate antennas at B and C, is determined with respect to point D, halfway between points B and C. As will be apparent from FIGURE 2, when $S_2$ is shorter than $S_1$ or $S_3$, angle $\delta_1$ is larger than angle $\delta$, and when $S_2$ is longer than $S_1$, angle $\delta$ is larger than angle $\delta_1$. Therefore, a parallax correction computer is provided to correct the direction cosine measurement of angle $\delta_1$ from point D to reference point O, thereby, in effect, converting angle $\delta_1$ to $\delta$. After resolution of the ambiguity of the intermediate direction cosin data, and correction of the parallax error, the intermediate direction cosine data is utilized to resolve the ambiguities of the fine direction cosine data determined by the signal received at the antennas at points A and B. Resolution of the ambiguities of the fine data pair of antennas is effected by the same servo system employed to resolve the ambiguities of the intermediate pair of antennas. It will be seen, therefore, that coarse direction cosine data derived from the conical scan antenna is applied to a servo system wherein the coarse data is utilized to remove the ambiguities of intermediate, but ambiguous phase comparison data from antennas at points B and C. The nonambiguous intermediate data is then employed in the servo system to resolve the ambiguities of fine, but highly ambiguous data from the antennas at points A and B. The resulting nonambiguous, fine direction cosine data is presented as a highly accurate shaft position, digital count, or analog voltage precisely defining one of the two direction cosines. The two direction cosines, together with range data, accurately and specifically define the position of an object at an arbitrary point P in space with respect to a known reference point O.

Figure 3:
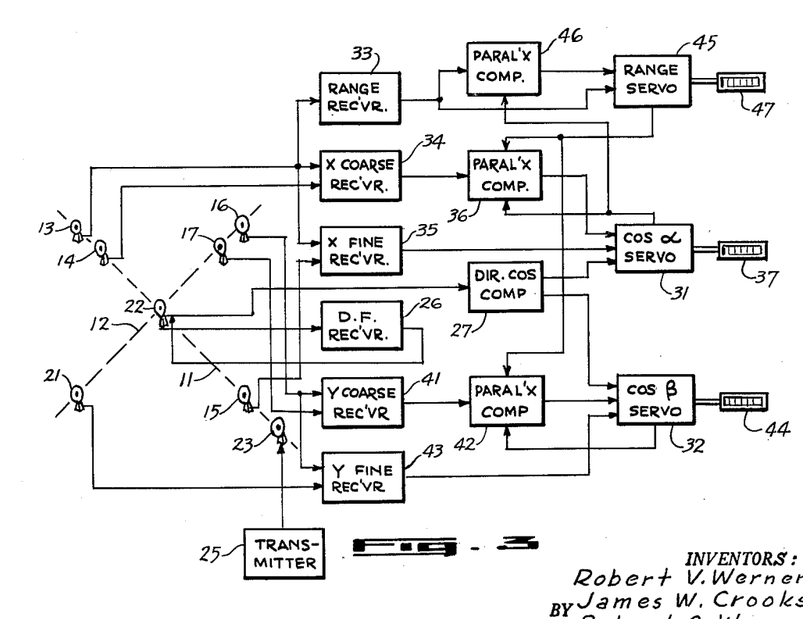
FIGURE 3 is a block diagram of a preferred embodiment of the position determining device of this invention.

A general diagram of the position determining system of this invention is illustrated by FIGURE 3. Two mutually perpendicular intersecting base lines, an X axis base line 11 and a Y axis base line 12, are provided. The X axis base line 11 is provided with a reference antenna 13 at a position on the base line equivalent to point B. In FIGURE 2, an intermediate data antenna 14 at a position equivalent to point C in FIGURE 2, and a fine data antenna 15, placed at a position equivalent to point A in FIGURE 2. Similarly, the Y axis base line 12 is provided with a reference antenna 16, intermediate data antenna 17, and a fine data antenna 21. At the point of intersection of the X and Y base lines, in a position corresponding to the reference point O in FIGURE 2, a conical scan direction finding antenna 22 is provided. A transmitting antenna 23 is provided on an extension of X axis base line 11, conveniently adjacent to receiving antennas 13, 14, 15, 16, 17, 21 and 22. An aircraft or missile 24 is provided with a transponder of the type disclosed in our co-pending application, Serial No. 548,182, entitled "Transmitter-Receiver," filed on November 21, 1955, and now Patent Number 2,972,047, issued February 14, 1961. The airborne transponder receives the signal transmitted at a first frequency from antenna 23 and retransmits the signal at a second frequency. The signal transmitted by the transponder is received simultaneously by direction cosine phase measuring antennas 13, 14, 15, 16, 17 and 21, and direction finding antenna 22. The signal received by antenna 13 is also employed to determine range.

The spacing of phase measuring antennas 13, 14, 15, 16, 17 and 21 are determined by the wavelength of the signal retransmitted by the transponder. The pairs of intermediate data phase measuring antennas, 13, 14, 16 and 17 are separated by 80 wavelengths. The pairs of fine data phase measuring antennas 13, 15, 16 and 21 are spaced 800 wavelengths apart. Thus, a variation of the value of the direction cosine from 0 to 1 corresponds to 800 fine cycles, each cycle representing a change of 0.00125 in numerical direction cosine value. Since there are 1600 positions in an arc of 180 degrees that will produce the same readings, the phase data from the intermediate direction cosine antenna pairs is employed to resolve the ambiguities of the data from the pairs of fine direction cosine data antennas. However, the intermediate pair of antennas produce data wherein 160 positions in an arc of 180 degrees having identical numerical phase data. The conical scan direction finding antenna 22 is employed to resolve the ambiguity of phase data obtained from the intermediate pair of antennas.

Transmitter and reference signal generator 25 supplies a frequency modulated radio signal to transmitting antenna 23, and in addition, furnishes various reference frequency signals, more fully described hereinbelow, to the several receivers and servo systems of the hereindisclosed embodiment of this invention. Exemplarily, the transmitter and signal generator 25 furnishes a radio-frequency carrier signal at a frequency of 5060 megacycles which may be frequency modulated by three modulation frequencies for use with the range determining portion of the system in a manner disclosed hereinbelow. The modulated 5060 megacycle signal is transmitted by antenna 23 and received by the transponder in aircraft 24. The transponder, as disclosed in our co-pending application Serial No. 548,182, receives the modulated 5060 megacycle signal and retransmits the modulation imposed upon a carrier frequency of 5000 megacycles. The 5000 megacycle signal transmitted by the transponder aboard aircraft 24 is simultaneously received by phase comparing antennas 13, 14, 15, 16, 17 and 21, and by direction finder antenna 22.

Direction finder antenna 22 preferably employs a conical scan, parabolic reflector system of the type frequently employed in connection with pulsed radar systems. Suitable conical scan antennas are described on pages 223 to 227 of TM 11–467, entitled "Radar System Fundamentals." Antenna 22 is furnished with a suitable tracking servo system of a type known to the art, whereby the antenna automatically tracks the source of the signal transmitted by the transponder aboard object 24. Antennas 13, 14, 15, 16, 17, 21 and 23, also having parabolic reflectors, are furnished with tracking servo systems responsive to the tracking servo system of direction finder antenna 22, whereby all the antennas of the system are automatically synchronized to point with antenna 22 toward the source of the signal transmitted by aircraft 24.

The 5000 megacycle signal received by conical scan direction finder antenna 22 is supplied to direction finder receiver 26. A 29 cycle per second amplitude modulation is imposed upon the received signal due to the constant speed rotating conical scanning means. The 29 cycle amplitude modulation is detected by receiver 26 and is employed to control a suitable servo system for directing the several parabolic reflectors toward the signal source, in a manner well-known to those skilled in the art. Azimuth and elevation data from antenna 22 are furnished to a computer 27, wherein azimuth and elevation information, furnished by suitable angle transducers associated with the directing means for antenna 22, is translated into signals representing the X and Y direction cosines. The coarse X direction cosine signal from computer 27 is applied to X direction cosin indicating servo system 31. Similarly, the Y direction cosine signal from computer 27 furnishes coarse Y direction cosine information to Y direction cosine indicating servo system 32.

Receiving antenna 13, on the X axis base line, serves as a common reference antenna for determining the intermediate X direction cosine data in cooperation with antenna 14, and in cooperation with antenna 15, for determining fine X direction cosine data. In addition, antenna 13 is connected to range receiver 33, supplying the range modulation signal received from aircraft 24 thereto. Receiving antenna 13 is also connected to intermediate X direction cosine receiver 34, and to fine X direction cosine receiver 35. Intermediate X direction cosine antenna 14 furnishes the second input signal for phase difference determination to intermediate data receiver 34. Intermediate data receiver 34 produces an output alternating voltage with a phase shift proportional to the difference of phase of the signal received from the transponder aboard aircraft 24 by antenna 13 in comparison with the phase of the signal received by antenna 14.

Figures 10, 11:
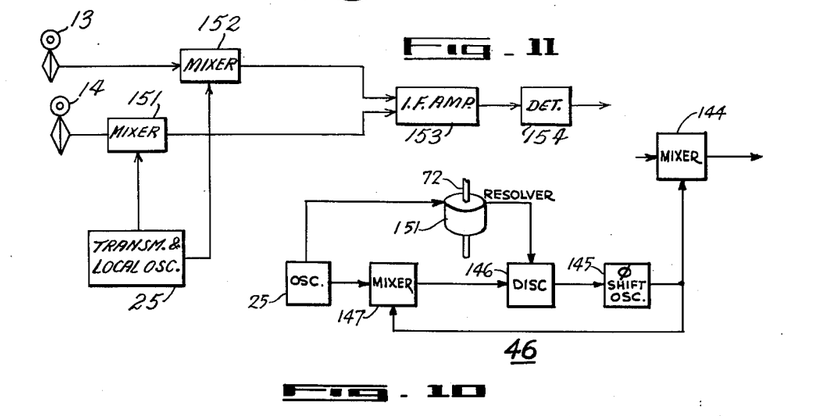

A receiver suitable for use in connection with this invention may conveniently include a mixer associated with each phase-measuring antenna responsive to the 5000 megacycle signal received by the antenna and to a local oscillator signal furnished by reference signal generator and transmitter 25. The local oscillator signal applied to the intermediate antenna mixer 151 is 750 cycles lower than the local oscillator signal applied to the reference antenna mixer 152, and the local oscillator signal applied to the fine antenna mixer is 2 kilocycles lower than that applied to the reference antenna mixer 152. The signals from the reference antenna mixer 152 and the intermediate data antenna mixer 151 are then applied to a single intermediate frequency amplifier 153. A detector 154, responsive to the intermediate frequency amplifier 153, provides a 750 cycle per second output signal with the phase thereof shifted with respect to the like frequency signal from signal generator 25 by an amount proportional to the difference in phase between the 5000 megacycle carrier signals received by antennas 13 and 14. However, as disclosed in connection with FIGURE 2, an additional correction for the parallax error must be applied to the phase data output signal from intermediate X direction cosine receiver 34. The intermediate phase data parallax correction is supplied by X axis parallax correction computer 36. The phase of the 750 cycle signal output from receiver 34 is additionally shifted by an amount equal to $$\frac{K}{r}(1-l^2)$$

wherein $l$ is the X direction cosine, and $r$ is the range. The parallax corrected 750 cycle signal is then supplied to X direction cosine indicating servo 31.

As disclosed hereinabove, the signal received by the X axis reference antenna 13 is applied to X axis fine data receiver 35. In addition to the signal from antenna 13, fine X axis receiver 35 is supplied with the signal received from X axis fine data antenna 15. X axis fine data receiver 35 is similar in function and structure to intermediate data receiver 34. The difference in phase between the signals received by fine antenna 15 and reference antenna 13 determines the phase of a 500 cycle output signal from receiver 35. The 500 cycle output signal from receiver 35 is supplied to X axis direction cosine indicating servo 31. The X axis direction cosine determined by X axis indicating servo 31 may conveniently be indicated by a shaft rotation counter 37, of a type well-known to the art.

The Y axis direction cosine is determined in a manner similar to that disclosed hereinabove for determining the X axis direction cosine. A Y axis intermediate direction cosine data receiver 41 is provided, responsive to the signal received by Y axis reference antenna 16 and by Y axis intermediate data antenna 17. Y axis intermediate data receiver 41 is furnished the signals received by antennas 16 and 17 and produces signal at a frequency of 750 cycles per second. The phase of the output signal from receiver 41 is shifted with respect to a reference signal from transmitter and signal generator 25 by an amount proportional to the phase difference of the signals received by antennas 16 and 17 in a manner similar to that disclosed hereinabove. The 750 cycle output signal from receiver 41 is applied to Y axis parallax correction computer 42, wherein the phase of the 750 cycle signal is further shifted to correct the parallax error discussed hereinabove in connection with X axis parallax correction computer 36. The parallax corrected signal is then applied to Y axis direction cosine indicating servo 32. Y axis reference antenna 16 and fine data antenna 21 are connected to Y axis fine direction cosine data receiver 43. A 500 cycle per second signal output from receiver 43 with a phase shift proportional to the phase difference between the signals received by antennas 16 and 21 is applied to Y axis indicating servo 32. The numerical valve of the Y axis direction cosine determined by indicating servo 32 may then be displayed in a suitable manner, such as shaft rotation operated counter 44.

The distance between the object 24 and the reference point at the junction of base lines 11 and 12 is determined by the phase delay of a frequency modulation signal imposed upon the 5060 megacycle signal generated by transmitter 25 and transmitted by transmitting antenna 23. The modulated 5060 megacycle signal is received by the transponder aboard object 24. The transponder retransmits the modulation signal superimposed upon a 5000 megacycle carrier generated by the transponder. The modulated signal transmitted by the transponder is received by range receiving antenna 13 and applied to range receiver 33. The phase of the received modulation signal is compared with the transmitted modulation signal, which is employed as a reference. The phase difference between these signals is proportional to the distance traveled, and is, therefore, indicative of the distance to object 24. The modulated signal received by antenna 13 is supplied to range receiver 33, wherein the signal is demodulated and the phase compared with the phase of the transmitted modulation signal of like frequency. The output signal from range receiver 33 comprises an alternating voltage shifted in phase by an amount proportional to range. A coarse and in intermediate range signal are applied directly to a range indicating servo 45, while the fine range indicating signal is first applied to a range parallax correction computer 46 before application to indicating servo 45.

The range signals are radiated from transmitting antenna 23, and are received on receiving antenna 13. Since transmitting antenna 23 is located along the X axis base line at a distance from system reference point greater than the distance of receiving antenna 13 therefrom, a parallax error will exist in the range measurement. Therefore, it will be apparent that a parallax correction is required for range data. The range parallax correction computer 46 applies a correction equal to $$\frac{e+f}{2} \cos \delta$$

wherein $e$ is the distance AO and $f$ is the distance OB in FIGURE 2. Since $e$ and $f$ are constant, the correction necessary is $K \cos \delta$, where K represents an arbitrary determined by the constant antenna spacing. The parallax corrected fine range data signal is supplied to range indicating servo 45, and a numerical indication of range is displayed on a shaft rotation operated counter 47.

Three successive modulation frequencies may be employed to more accurately determine range. In the hereindisclosed embodiment, a first low modulation frequency exemplarily at 157 cycles per second, is employed to provide a coarse, nonambiguous indication of range. A second, higher, modulation frequency, conveniently, 3.93 kilocycles provides an intermediate, ambiguous range indication, and a third still higher modulation frequency of 98.35 kilocycles provides a fine, but still more ambiguous indication of range. The first, rough range determination is employed to resolve the ambiguities of the intermediate range determination. The ambiguity-corrected intermediate range determination is then employed to resolve the ambiguities of the fine range determination. Range indicating servo system 45, further disclosed hereinbelow, successively measures and indicates coarse, intermediate and fine range data in a manner similar to the determination of the direction cosines in connection with the direction cosine indicating servos.

It will be seen from FIGURE 3 that the X and Y base line direction cosine channels are similar. Therefore, only the X base line direction cosine channel will be described in detail herein. As disclosed hereinabove, a radio-frequency signal of 5060 megacycles is generated by transmitter 25 and radiated by transmitting antenna 23. The radiated signal is received by a transponder aboard object 24. The 5060 megacycle signal received by the transponder is retransmitted at a frequency of 5000 megacycles as disclosed in our co-pending application. Conical scan antenna 22 receives the signal transmitted by the transponder. The signal received by antenna 22 is amplitude modulated by the conical scan apparatus in a manner well-known to those skilled in the art. Direction finder receiver 26 accepts the received signal modulated at the conical scan frequency and furnishes an output signal controlling an antenna positioning servo system adapted to continuously orient antenna 22 toward object 24. Automatic tracking conical scan antenna, receiver and servo systems of this type are old and well-known to the art, and, therefore, will not be described in detail herein.

In addition to the automatic tracking servo system associated with conical scan antenna 22, a servo position transmitter is provided which is adapted to transmit position control signals to suitable positioning control servos associated with each of antennas 13, 14, 15, 16, 17, 21 and 23. Therefore, all the parabolic reflector antennas of the system automatically track object 24 in synchronism with conical scan antenna 22.

Elevation and azimuth angle information obtained from the servos associated with conical scan direction finder antenna 22 is converted by computer 27 into direction cosine information suitable for use in X and Y direction cosine indicating servos 31 and 32. Computer 27, illustrated in FIGURE 4, includes a first resolver 51 having a stator winding 52, a first rotor winding 53, and a second rotor winding 54. Rotor windings 53 and 54 are rotated by a shaft 55 by an amount proportional to the azimuth angle of direction finder antenna 22. Adjacent ends of each of rotor windings 53 and 54 are connected together by conductor 56 and are grounded. The other end of winding 53 is connected to the Y direction cosine indicating servo 32 by means of conductor 56, while the other end of winding 54 is connected to X direction cosine indicating servo 31 by means of conductor 57. Stator winding 52 of servo 51 is connected to rotor winding 61 of a second resolver 62. Resolver 62 also has a stator winding 63, connected to transmitter and signal generator 25. Rotor winding 61 of resolver 62 is mounted so as to be rotated through an angle proportional to the elevation angle of antenna 22 by means of a shaft 64.

Figures 4, 5, 6:
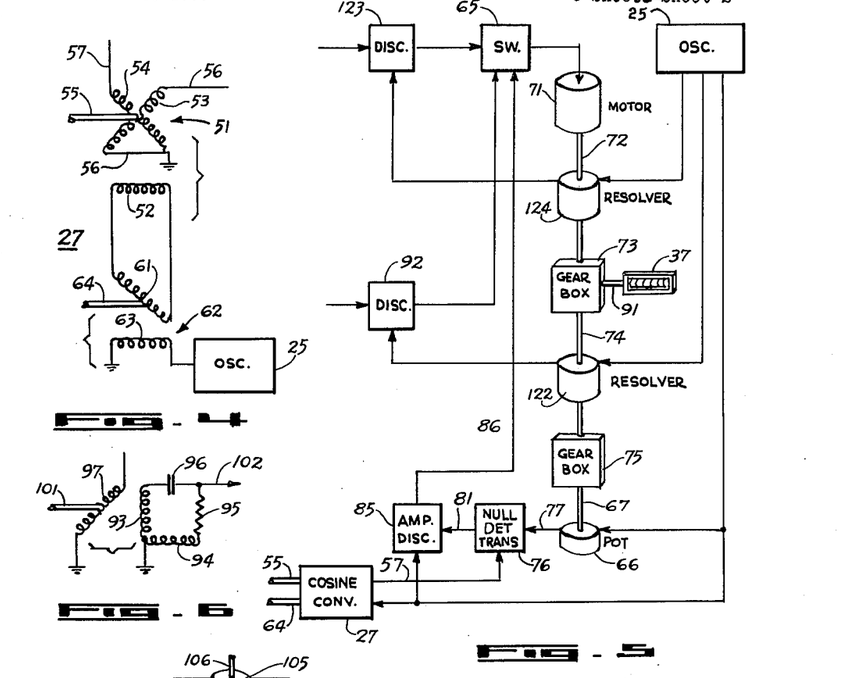
FIGURE 4 illustrates the cosine converting computer utilized in the embodiment of FIGURE 3.
FIGURE 5 illustrates one of the angle indicating servo systems utilized in FIGURE 3.
FIGURE 6 illustrates a typical phase shifting resolver employed in connection with this invention.

A reference alternating voltage at a convenient frequency, exemplarily, 400 cycles, is supplied to stator winding 63 of resolver 62 by signal generator 25. A voltage amplitude proportional to the cosine of the angular position of shaft 64, and therefore, of the elevation angle of antenna 22, is induced in rotor winding 61. Stator winding 52 of resolver 51 receives a voltage proportional to the cosine of the elevation angle $\theta$ produced by resolver 62. Furthermore, the angular position of shaft 55 is proportional to the azimuth angle $\phi$ of antenna 22 as disclosed hereinabove. A voltage is induced in rotor winding 53 equal to the product of the cosine of the azimuth angle $\phi$ and the voltage equal to cosine $\theta$ furnished to stator winding 52 by resolver 62, and a voltage is induced in rotor winding 54 equal to the product of the sine of the azimuth angle $\phi$ and the cosine of the elevation angle $\theta$ supplied by resolver 62. It is apparent, therefore, that a 400 cycle voltage is produced upon conductor 56 having a magnitude proportional to the direction cosine of the angle $\beta$, where $\cos \beta = \cos \theta \sin \phi$, and a similar voltage appears upon conductor 57 varying in magnitude proportional to the direction cosine of the angle $\alpha$ where $\cos \alpha = \cos \theta \cos \phi$.

A typical direction cosine indicating servo is illustrated in FIGURE 5. Since both the X and Y direction cosine indicating servos are substantially identical, only the X direction cosine indicating servo is illustrated and described herein. As disclosed in connection with FIGURE 3, the X direction cosine indicating servo simultaneously receives phase-shifted signals from fine phase data receiver 35, intermediate phase data receiver 34, and translated azimuth and elevation angle data from direction finder antenna 22. A switching device 65 serves to switch control of the servo indicating system to a more accurate information source if the error voltage resulting from control by a less accurate source becomes small enough to enable a non ambiguous indication by the more accurate information source. As will be obvious to one skilled in the art, switching device 65 may conveniently consist of a relay system operated by servo system error voltages. Such a switching system is described on pages 372–375 of "Electronic Instruments," edited by I. A. Greenwood, Jr., J. V. Holdam, Jr., and D. Macrae, Jr., and published by McGraw-Hill Book Company, N.Y., in 1948. Since such error controlled switching systems are well-known to the art, switching circuit 65 will not be described in detail herein.

Azimuth and elevation data from direction finder antenna 22 is supplied to direction cosine computer 27 by means of shafts 55 and 64, respectively. An alternating voltage varying in amplitude in accordance with the X base line direction cosine of the angle X is developed by computer 27 from a reference voltage level supplied by signal generator 25 in the manner disclosed hereinabove in connection with FIGURE 4. The reference voltage from signal generator 25 is applied to a potentiometer 66, positioned by a shaft 67. Servo motor 71 drives shaft 67 indirectly through two 25:1 reduction gear boxes 73 and 75. It will be apparent, therefore, that potentiometer 66 is rotated $1/625$ of a revolution for each revolution of servo motor 71. Shaft 72 directly driven by servo motor 71, operates gear box 73. Shaft 74 rotating at a rate $1/25$ of motor 71, connects gear box 73 to gear box 75. Shaft 67, having potentiometer 66 mounted thereupon, rotates at a rate $1/25$ that of shaft 74. Potentiometer 66 attenuates the reference voltage from signal generator 25 by an amount proportional to the angular position of shaft 67. The attenuated signal from potentiometer 66 is applied to a null detecting transformer 76 by conductor 77. Null detecting transformer 76 compares the amplitude of the attenuated signal furnished by potentiometer 66 with the amplitude of the voltage representing the direction cosine from computer 27, and furnishes an output voltage on conductor 81 of a magnitude and phase proportional to the magnitude and sense of the difference in amplitude.

Figure 7:
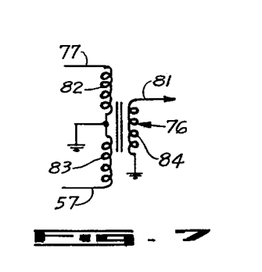
FIGURE 7 represents a null detecting transformer employed in this invention.

Null detecting transformer 76 is illustrated in detail in FIGURE 7. Primary windings 82 and 83 are connected to input terminals 77 and 57 respectively. Secondary winding 84 is connected to output conductor 81. Primary windings 82 and 83 are wound in such a manner that a voltage induced in secondary winding 84 by the signal applied to primary winding 82 is opposed to the voltage induced in secondary winding 84 by the signal applied to primary winding 83. It will be apparent, therefore, that the resultant voltage induced in secondary winding 84 and appearing on output conductor 81 will be of a magnitude and phase proportional to the difference of the relative amplitudes of the voltages applied to primary windings 82 and 83 by potentiometer 66 and computer 27, respectively.

The differential output voltage from null detecting transformer 76 is applied by conductor 81 to an amplitude discriminator 85. A reference voltage from signal generator 25 is also applied to a diode amplitude discriminator 85, of a type well-known to the art. Such amplitude discriminators produce an output voltage of a polarity and amplitude proportional to the difference in phase and amplitude of the input signal with respect to the reference signal from signal generator 25.

Conductor 86 connects the output of amplitude discriminator 85 to switching device 65. As disclosed hereinabove, switching device 65 serves to connect the output signal from the coarse data channel to servo motor 71, which is rotated when an error voltage is present on conductor 86. The polarity of the error voltage determines the direction of rotation of servo motor 71. An indicating device 37, which may conveniently be a shaft rotation counter, operated by motor 71 through shaft 72, gear box 73, and indicator actuating shaft 91. Simultaneously, shaft 74 is driven through a gear box 73 at a rate 1/25 that of shaft 72. Shaft 74 drives a second gear box 75, which in turn rotates shaft 67 at a rate 1/25 that of shaft 74. Shaft 67 rotates potentiometer 66 in the coarse data feedback circuit. Potentiometer 66 serves to attenuate the reference voltage from signal generator 25. The output voltage from potentiometer 66, applied to null detecting transformer 76, is varied by rotating potentiometer 66. When the output voltage from potentiometer 66 is equal in amplitude to the voltage supplied by computer 27, representing the numerical value of the base line direction cosine, the error voltage becomes zero, and motor 71 stops.

As potentiometer 66 is rotated by motor 71, the error voltage on conductor 86 is reduced, and at a sufficiently low valve, switching circuit 65 switches control of servo motor 71 to the intermediate angle data source. The rotation of servo motor 71 under control of direction finder antenna 22 operates shaft rotation counter 37 to give a rough indication of the numerical value of cosine α.

As switching circuit 65 transfers control to the X base line, intermediate data pair of antennas, 13 and 14, the output signal from receiver 34 shifted in phase in the manner disclosed hereinabove, is applied to a discriminator 92. However, it is desirable that a parallax correction be applied to the intermediate data signal, since antennas 13 and 14 are not symmetrically spaced about the origin of the X and Y axes.

Figure 8:
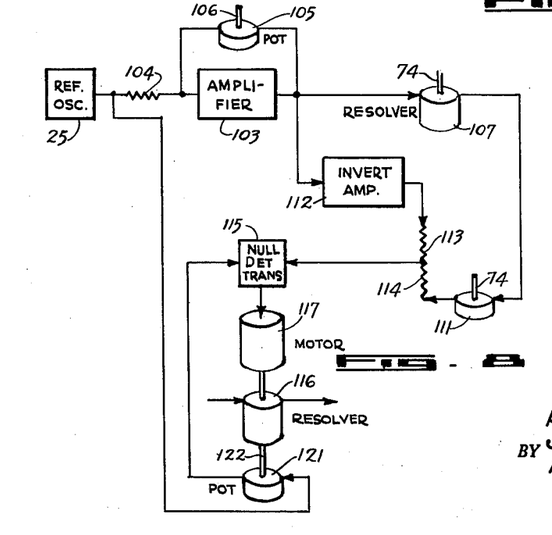
FIGURE 8 is a schematic diagram of a parallax correction computer employed in connection with the intermediate angle data channel.

A suitable parallax correction computer is illustrated by FIGURE 8. As disclosed hereinabove, the intermediate determination of direction cosine data is accomplished by measuring the difference in phase between the signals received by antennas 13 and 14. Receiver 34 produces an alternating voltage at a frequency of, exemplarily, 750 cycles per second, shifted in phase by an amount proportional to the phase difference between the received signals. Therefore, in order to correct for the error due to parallax, the phase of the 750 cycle signal from receiver 34 is further shifted by an amount equal to $$\frac{K}{r}(1-\cos^2 \alpha)$$

wherein K is an arbitrary constant dependent upon antenna spacing and r is equal to the range of the object. The required additional phase shift is accomplished by means of an automatic servo controlled phase shifting resolver.

A typical phase shifting resolver of the type employed in connection with this invention is illustrated by FIGURE 6. Two stator windings, 93 and 94, are mounted at right angles to one another, and have a common grounded junction. A resistor 95 is connected to winding 94, and a capacitor 96 is connected to winding 93. Capacitor 96 and resistor 95 are also connected to a common output junction. A rotor winding 97 is mounted to rotate with a shaft 101. One end of rotor winding 97 is connected to a source of alternating current, while the other end is grounded. The alternating current flowing through rotor winding 97 induces voltages in stator windings 93 and 94. The amplitude of the voltages induced in windings 93 and 94 is determined by the relative angular position of finding 97. When rotor winding 97 is parallel to stator winding 93, a voltage is induced in winding 93, but none is induced in stator winding 94. Conversely, when rotor winding 97 is rotated to a position parallel to winding 94, a voltage is induced therein, but no voltage is induced in winding 93. However, at intermediate angular positions of rotor winding 97, a voltage is induced in both of stator windings 93 and 94. The amplitudes of the induced voltages vary sinusodially with the angular position of rotor winding 97. The impedance of capacitor 96 is equal to the resistance of resistor 95 at the operating frequency. It will be apparent, therefore, that when rotor winding 97 is parallel to winding 94, a voltage is induced therein and applied to the output conductor 102 shifted in phase by 45 degrees in one direction, while no voltage is induced in winding 93. When rotor winding 97 is parallel to winding 93, the output voltage on conductor 102 is shifted 45 degrees in the other direction. At intermediate positions of shaft 101, the phase of the output voltage is shifted proportionally with respect to the input voltage applied to rotor winding 97.

Returning now to FIGURE 8, transmitter and reference oscillator 25 supplies a 400 cycle per second alternating voltage to a feedback amplifier 103 through resistor 104. A potentiometer 105, mounted on range servo indicator shaft 106 but not shown in FIGURE 9, serves as a variable resistance feedback circuit around amplifier 103. Range shaft 106 adjusts the resistance of potentiometer 105 to an amount proportional to the reciprocal of the range, and therefore, adjusts the amplitude of the output voltage of amplifier 103 to represent the negative reciprocal of range, $$\frac{-1}{r}$$

The output of feedback amplifier 103 is negative since a phase inversion occurs in amplifier 103, as is well-known in the art.

The output voltage from feedback amplifier 103, representing $$\frac{-1}{r}$$

is applied to resolver 107, mounted for rotation on direction cosine indicator shaft 74. The resistance of potentiometer 107 is varied by an amount inversely proportional to the value of the direction cosine by means of shaft 74, thereby multiplying the input voltage representing $$\frac{-1}{r}$$

by cos α. The resultant voltage, representing $$\frac{-\cos \alpha}{r}$$

is applied to a second potentiometer 111, also mounted for rotation on direction cosine indicator shaft 74. The resistance of potentiometer 111 is varied by an amount inversely proportional to the value of the direction cosine in a manner similar to potentiometer 107. Again, the input signal is multiplied by an amount proportional to cos α. The resultant output signal, therefore, is proportional to $$\frac{-\cos^2 \alpha}{r}$$

The output signal representing $$\frac{-1}{r}$$

from feedback amplifier 103 is also applied to a phase inverting amplifier 112. The output signal from phase inverting amplifier, proportional to $$\frac{1}{r}$$

is applied to resistor 113 of a summing network which includes resistor 113 and resistor 114. The output voltage from potentiometer 111, representing $$\frac{-\cos^2 \alpha}{r}$$

is applied to resistor 114 of the summing network. The resultant output voltage of the summing network is, therefore, proportional to $$\frac{1}{r} - \frac{\cos^2 \alpha}{r}, \text{ or, } \frac{1-\cos^2 \alpha}{r}$$

The output voltage from the summing network is applied to a null detecting transformer 115, of the type illustrated in FIGURE 7. Null detecting transformer 115 serves as an error detector for a feedback servo system for positioning a phase shifting resolver 116. Phase shifting resolver 116 serves to change the phase of the data output signal from intermediate direction cosine receiver 34 by an amount proportional to $$\frac{1-\cos^2 \alpha}{r}$$

thereby compensating for the parallax error due to the assymetrical spacing of antennas 13 and 14.

Phase shifting resolver 116, similar to the phase shifter disclosed hereinabove in connection with FIGURE 6, is positioned by a servo system including null transformer 115, a servo motor 117, and a feedback potentiometer 121. A reference voltage from reference oscillator 25 is applied to potentiometer 121. The reference voltage is attenuated by potentiometer 121 by an amount dependent upon the angular position of a shaft 122, rotated by servo motor 117. The attentuated voltage from potentiometer 121 is applied to the other terminal of null detecting transformer 115. The output voltage produced by null detecting transformer 115 is proportional in amplitude and phase to the amount and sense of the difference between the voltage representing the amount $$\frac{1-\cos^2 \alpha}{r}$$

and the voltage attenuated by potentiometer 121. Servo motor 117, therefore, rotates potentiometer 121 and phase shifting resolver 116 by means of shaft 122 until the two input signals to the null detecting transformer become equal. It will be apparent, therefore, that the phase of the output signal from resolver 116 is shifted with respect to the input signal by an amount proportional to $$\frac{1-\cos^2 \alpha}{r}$$

thereby correcting the parallax error due to the assymetric position of intermediate direction cosine receiving antennas 13 and 14.

Returning now to FIGURE 5, the parallax corrected signal from intermediate data receiver 34 is applied to discriminator 92. In addition to the parallax corrected angle indicating signal from intermediate data receiver 34, a second reference signal is applied to discriminator 92 from signal generator 25 through a phase shifting resolver 122. Inasmuch as coarse determination of the direction cosine has been obtained from the azimuth and elevation of direction finder antenna 22 by the means disclosed hereinabove, shaft 74 and phase shifting resolver 122 are positioned so that a nonambiguous determination of the phase difference of less than one cycle of intermediate phase data may be obtained. An alternating voltage, the phase thereof shifted by an amount proportional to the phase difference of the signals received by antennas 13 and 14, and further shifted in phase to correct for the parallax error, is applied to discriminator 92. Discriminator 92 compares the phase of the input signal with the phase of a reference signal from signal generator 25. The amount of phase difference and the sense thereof determine the magnitude and polarity of a unidirectional voltage produced by discriminator 92 in a manner well-known to those skilled in the art. As disclosed hereinabove, since the error voltage from coarse data discriminator 85 is sufficiently small, switching device 65 connects the output error voltage from discriminator 92 to servo motor 71. Servo motor 71 revolves upon application of the error voltage, driving shaft 72, indicator 37, shaft 74 through 25:1 reduction gear box 73, and phase shifting resolver 122. Resolver 122 is rotated until the phase of the output signal from resolver 122 is identical to the phase of the direction cosine signal. When the phases of the two signals applied to discriminator 92 are brought to equality, the output voltage therefrom approaches zero, and servo motor 71 stops. At this point, a more precise indication of the direction cosine appears in counter 37, and switching circuit 65 switches control of servo motor 71 to the fine direction cosine channel.

The X base line fine direction cosine antennas 13 and 15 are connected to fine data receiver 35, similar in structure and function to intermediate data receiver 34. Thus, receiver 35 compares the phase of the signals received by the two antennas and shifts the phase of a suitable A.C. reference signal, exemplarily, 2000 cycles per second, supplied by a signal generator 25 by an amount proportional to the phase difference between the signals received by antennas 13 and 15. The phase shifted 2000 cycle signal from receiver 35 is applied to a discriminator 123, wherein the phase of the received signal is compared with the phase of the 2000 cycle reference signal from reference signal generator 25. Another phase shifting resolver 124, connected for rotation by shaft 72, is serially connected between signal generator 25 and discriminator 123. A D.C. voltage of a polarity and magnitude proportional to the sense and amount of phase difference between the applied signals is produced by discriminator 123 and applied to servo motor 71 through switching circuit 65. Servo motor 71 rotates phase shifting resolver 124, mounted for rotation with shaft 72 in the sense required to reduce the phase difference between the reference signal and the data signal to zero. As shaft 72 is rotated, the numerical direction cosine data displayed by indicator 37 is adjusted to indicate a still more accurate measurement of the X base line direction cosine.

It will be apparent, therefore, that X direction cosine indicating servo 31 automatically and continuously resolves the ambiguities of accurate data by means of less accurate nonambiguous data. Control of the rotation of servo motor 71 is automatically switched to coarser data when an error voltage from the coarser control channels indicates that an ambiguity may develop in the more accurate data channel. The coarsest data, provided by the conical scan direction finder antenna 22, its associated receiver 26, and data converter 27, controls the rotation of servo motor 71 until the amplitude of the voltage from potentiometer 66 is equal to the amplitude of the voltage provided by computer 27. At this time, switching circuit 65 transfers control to the intermediate data channel, including antennas 13 and 14, receiver 34, parallax correction computer 36, discriminator 92, and phase shifting resolver 122. The error signal from discriminator 92 causes motor 71 to rotate in the proper direction to reduce the error signal to a suitably low amount, whereupon control of motor 71 is transferred to the fine data channel by switching circuit 65. Since gear box 73 provides a 25:1 ratio of reduction between shaft 72 and shaft 74, gear box 75 provides a second 25:1 ratio of reduction between shaft 74 and shaft 67, and counter drive shaft 91 is geared to rotate at the same speed as shaft 72, the initial balancing of the servo by coarse data provides a relatively inaccurate positioning of fine data shaft 72 and counter 37. However, the shaft position is sufficiently accurate to select the proper one of the numerous identical direction cosine indicating phase differences. The direction cosine indicating servo system is then balanced by the intermediate phase data, refining the indication presented by counter 37, and phase shifter 124 and fine data shaft 72 are rotated to a position whereby the correct one of the plurality of fine direction cosine indicating phase differences may obtain control of the servo system. As the direction cosine indicating servo system is balanced by the fine phase data, the numerical indication of the direction cosine presented by counter 37 is refined to a highly accurate measurement of the direction cosine. Although only the X base line direction cosine indicating servo 31 has been described in detail herein, it will be apparent that the Y base line indicating servo 32 is substantially identical in structure and function thereto.

Figure 9:
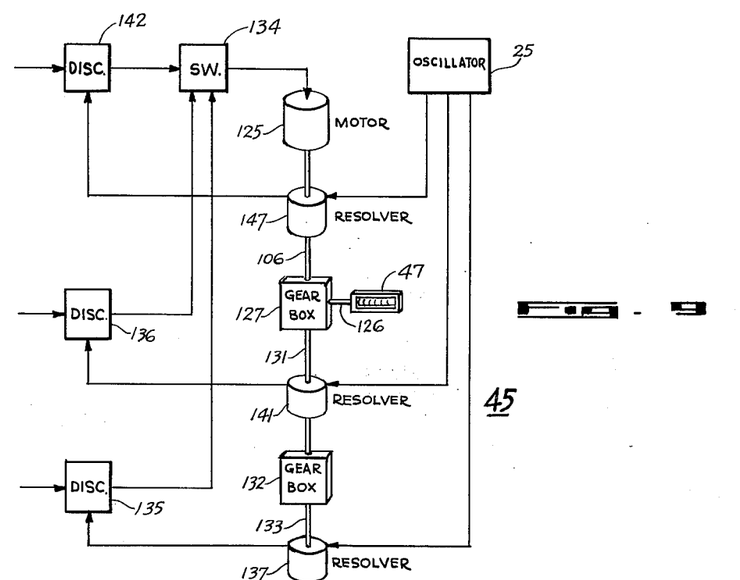
FIGURE 9 illustrates the range indicating servo channel employed in the embodiment of this invention illustrated by FIGURE 3.

Range indicating servo system 45, illustrated schematically by FIGURE 9, operates in a manner analogous to the direction cosine indicating servos 31 and 32. A servo motor 125, controlled by the range representing signals, is directly connected to, and rotates a fine data shaft 106. A numerical range indicating counter 47 is connected by means of shaft 126 to rotate with shaft 106. A reduction gear box 127, driven by shaft 106, drives intermediate data shaft 131, geared down by a factor of 25 to 1. Shaft 131 in turn drives a second reduction gear box 132. Coarse data shaft 133 is rotated by gear box 132 at a rate $\frac{1}{25}$ that of intermediate data shaft 131.

A switching circuit 134, similar to switching circuit 65 in FIGURE 5, serves to switch control of servo motor 125 from coarser to finer data as the errors of the coarser data are reduced sufficiently to resolve the ambiguities present in finer data.

As disclosed hereinabove, the 5060 megacycle per second carrier furnished by transmitter and reference oscillator 25 to transmitting antenna 23 is frequency modulated by a 157.4 cycle per second signal, a 3.93 kilocycle per second signal, and a 98.356 kilocycle signal, for coarse, intermediate and fine range measurements respectively. The modulated 5060 megacycle carrier transmitted by antenna 23 is received by the transponder aboard object 24. As disclosed in our co-pending application, Serial No. 548,182, for "Transmitter-Receiver," the transponder carried aboard object 24 retransmits a 5000 megacycle carrier frequency modulated by the range determining signals. The 5000 megacycle carrier transmitted by the transponder, modulated by the three range determining signals, is received by X base line reference antenna 13, which also serves as a range signal receiving antenna. The modulated 5000 megacycle signal from antenna 13 is applied to range receiver 33, wherein the three modulated frequencies are detected by means well-known to the art. A band pass filter, not shown, permits the 157.4 cycle per second signal and the 3.93 kilocycle signal to be applied directly to a coarse range data signal discriminator 135 and to an intermediate range data discriminator 136, respectively, of range indicating servo 45. The 98.356 kilocycle fine data signal is applied to a range parallax correction computer 46, wherein a phase shift is introduced of an amount and direction adapted to correct the parallax error caused by the unequal spacing of transmitting antenna 23 and receiving antenna 13 from the reference point at intersection of the X and Y base lines.

Referring now to FIGURE 9, the coarse range modulation signal of 157.4 cycles per second transmitted by antenna 23, received by antenna 13, and detected in range receiver 33 is applied to coarse channel discriminator 135. The 157.4 cycle per second modulating signal supplied by transmitter and signal generator 25, in addition to being transmitted to, and received from the transponder, is applied directly to discriminator 135 through a phase shifting resolver 137. Since the signal furnished to discriminator 135 by receiver 33 has traversed the distance to the object and returned, it is delayed with respect to the signal furnished directly by transmitter and reference oscillator 25 by an amount proportional to the distance traveled, thereby introducing a phase shift. The wave delayed by travel to and from the object 24 and the signal directly from transmitter and reference oscillator 25 are both applied to discriminator 135. A direct voltage output signal is produced by discriminator 135 proportional to the difference in phase between the delayed signal and the reference signal. The output potential from discriminator 135 is applied to servo motor 125. Phase shifting resolver 137, connected between signal generator 25 and discriminator 135, is rotated by servo motor 125 until the phase difference between the received signal and the signal from oscillator 25 is reduced to zero, whereupon the error voltage applied to servo motor 125 by discriminator 135 is reduced to zero, and servo motor 125 stops. As disclosed hereinabove, shaft 133 and phase shifting resolver 137 mounted thereupon, are driven by servo motor 125 through two 25 to 1 reduction gear boxes, 127 and 132. Shaft 126 and counter 47, actuated thereby, are driven directly by servo motor 125. It will be seen, therefore, that a coarse indication of range is displayed by indicator 47 in response to the received coarse range signal.

As the servo system is brought into balance by the coarse data, switching circuit 134 transfers control to intermediate phase data. The 3.93 kilocycle per second intermediate data signal is transmitted and received in the same manner as disclosed hereinabove in connection with the 157.4 cycle per second coarse data signal. Intermediate data discriminator 136 compares the phase of the received 3.93 kilocycle intermediate data signal with that of the 3.93 kilocycle signal from signal generator 25. The reference signal from signal generator 25 is applied to discriminator 136 through an intermediate range data phase shifting resolver 141. Servo motor 125 is energized by the error voltage produced by discriminator 136, rotating phase shifting resolver 141 until the phase of the two signals applied to discriminator 136 become equal. At this time the error voltage output from discriminator 136 becomes zero, and motor 125 stops. Indicator 47 displays range data of intermediate accuracy at this time. However, switching circuit 134 connects servo motor 125 to the fine data discriminator 142.

Although the fine range data signal received from the transponder may be applied directly to discriminator 142 after demodulation, increased accuracy may be obtained by applying a correction for the parallax error due to the asymetrical spacing of transmitting antenna 23 and range receiving antenna 13 about the origin at the intersection of the X and Y base lines. In order to correct this parallax error, a range parallax correction computer 46 is furnished, inserted between range receiver 33 and fine data discriminator 142. A suitable range parallax correction computer is illustrated by FIGURE 10. The 98.356 kilocycle per second fine data signal detected by range receiver 33 is applied to a mixer 144. The other signal applied to mixer 144 is furnished by an electronic servo system including a phase shift oscillator 145, a discriminator 146, a mixer 147, and a phase shifting resolver 151 mounted on X direction cosine indicating servo fine data shaft 72. Reference signal generator 25 applies a 500 cycle per second voltage to phase shifting resolver 151, and a 98.356 kilocycle per second signal to mixer 147. A phase-shift oscillator 145, of a type well-known to the art, supplies a 97.856 kilocycle per second signal to mixer 147, and to mixer 144. The difference frequency of 500 cycles is furnished by mixer 147 to discriminator 146. The 500 cycle signal from signal generator 25, shifted in phase by resolver 151 by an amount proportional to the X direction, cosine, and the 500 cycle difference frequency from mixer 147 cause discriminator 146 to furnish a unidirectional output voltage proportional to the phase difference therebetween. The D.C. output from discriminator 146 is applied to phase shift oscillator 145 in such a manner as to cause the phase of the 97.856 kilocycle output signal to shift in direction and amount sufficiently to cause the error voltage from discriminator 146 to become zero. It will be apparent, therefore, that the phase of the 97.856 kilocycle signal generated by phase shift oscillator 145 is controlled by, and varies proportionally to the position of phase shifting resolver 151, which is controlled in turn by the value of the X direction cosine.

The output signal from phase shift oscillator 145 is also applied to mixer 144, together with the received 98.356 kilocycle fine range data signal detected by receiver 33. The 500 cycle per second difference frequency output signal from mixer 144 is, therefore, shifted in phase with respect to the 500 cycle reference signal from signal generator 25 by an amount determined by the phase delay of the received signal, and additionally, by an amount proportional to the value of the X direction cosine. It will be apparent therefore, that the range correction phase-shift supplied by the range parallax correction computer in effect, moves the range measurement reference point to the base line intersection.

The parallax corrected 500 cycle fine range signal from mixer 144 is applied to fine data discriminator 142. The phase of the received fine range signal is compared therein with the 500 cycle reference signal supplied by signal generator 25 through phase shifting resolver 143. The error signal produced by discriminator 142 is applied to servo motor 125 through switching circuit 134. Motor 125, actuated by the error signal, rotates phase shifting resolver 143 by means of shaft 106 in the proper direction to reduce the error voltage produced by discriminator 142 to zero. Shaft 126, driving range indicator 47 is rotated by shaft 106. Range indicator 47, therefore, displays an accurate numerical indication of range, which, when taken in conjunction with the direction cosine data displayed by indicators 37 and 44, accurately and nonambiguously locates object 24 with respect to the reference point at the intersection of the base lines.

It will be apparent from the foregoing that means have been disclosed herein for accurately determining the position of an object 24, located at an arbitrary point P in space, in relation to a known reference point O. As disclosed hereinabove, the position of the object is determined by measuring the angles between each of two intersecting, mutually perpendicular, base lines and the radius rector from the point of intersection of the base lines to the object, thus establishing a line of position coincident with the radius rector. Distance of the object along the radius rector from the reference point is determined by means of a range receiver and associated indicating means.

The line of position between the object and the reference point at the intersection of the two mutually perpendicular base lines is roughly determined by means of conical scan direction finder antenna 22 at the reference point, and is more accurately determined by measuring the difference in phase between the signals received at two antennas spaced a known number of wave lengths apart. Two pairs of antennas, including a common antenna shared by both pairs, provide means for determining intermediate and fine angle data for each base line. Each pair of intermediate and fine data antennas are provided with a receiver furnishing an output signal representative of the phase difference, and therefore of the cosine of the angles between the line of position and the two base lines, as disclosed hereinabove.

The azimuth and elevation angle of the conical scan antenna 22, when locked on the signal transmitted by the transponder aboard object 24, is translated into direction cosines by means of computer 27. The direction cosines so determined are applied to indicating servos 31 and 32, wherein they are utilized to resolve the ambiguous direction cosine data supplied by intermediate phase data receivers 34 and 41, responsive to antenna pairs 13, 14, 16, 17. As disclosed hereinabove, the data supplied by the phase difference receivers are ambiguous, since the receiving antennas are spaced several wave lengths apart, and as a result, several angular positions result in identical phase difference readings. Angle data supplied by conical scan antenna 22, associated receiver 26, and computer 27 is accurate enough to enable indicating servos 31 and 32 to select the correct angular position, although conical scan data is not as accurate as the phase difference data.

Indicating servos 31 and 32 utilize the direction cosine data derived from the conical scan antenna to resolve the ambiguous intermediate phase data by means of the error controlled servo system disclosed hereinabove. Suitable indicators display the numerical value of each direction cosine.

A final, accurate measurement of the direction cosines is furnished by measuring the phase difference between the signals received by fine data antenna pairs 13, 15, and 16, 21. Receivers 35 and 43, responsive respectively to antenna pairs 13, 15 and 16, 21, furnish phase shifted signals to indicating servos 31 and 32 respectively. Since these antennas are spaced apart further than the intermediate data antennas, a more accurate measurement may be obtained. However, the direction cosine measurement obtained by the indicating servos from the intermediate data antennas, after ambiguity resolution of the intermediate data, is accurate enough to select the correct one of the many possible angles indicated by the many identical phase differences between the signals received by the fine data antennas.

A servo motor in each indicating servo, responsive to the angle representing signals from the coarse, intermediate and fine data channels, is selectively connected to one of the signal channels by switching circuit 65. When the error of the coarse data indication is sufficiently small to enable resolution of ambiguities, control of the indicator actuating servo motor is transferred to the intermediate data source. Similarly, control of the indicator actuating servo motor is transferred to the fine data source when the error of the indication is sufficiently small to enable the ambiguity of the fine phase data to be resolved. However, when the angular position of object 24 with respect to the base lines have been accurately determined, and displayed on the indicator, the fine channel of the indicating servo will continue to track the object. If the fine data servo channel should lose the object, control of the servo is automatically transferred to the intermediate or coarse channel, as required. Control of the servo system is transferred back to the fine data channel when the errors in the coarse and intermediate data channels are small enough to enable the ambiguity of the fine data to be resolved. Thus, the servo system continuously and automatically tracks the angular relationship of object 24 to the base line and displays an accurate numerical indication of the direction cosine.

Distance to the object is measured by comparing the phase of a transmitted modulation signal with the phase of the same modulation signal received by antenna 13 and detected by range receiver 33. The low frequency signal has a wave length sufficiently to allow a nonambiguous measurement of range by means of the phase difference between the transmitted and received modulation. Measurement of range by means of the low frequency is accurate enough to enable resolution of the several ambiguous phase differences present in range measurement by a more accurate, higher modulation frequency, having a shorter wave length. A still more accurate range determination is made by employing a still higher frequency, the ambiguities inherent thereto being resolved by the intermediate range determination. A parallax correction may be inserted in the fine range measurement to compensate for the asymetrical spacing of the transmitting antenna 23 and the range receiving antenna 13.

Range indicating servo 45, responsive to range receiver 33, presents a numerical indication of range in a manner similar to the direction cosine indicating servos. The servo is first balanced by the coarse data, providing a rough indication of range on counter 47. The coarse balance is sufficiently accurate to enable the servo to select the correct one of the several identical phase indications of the intermediate range measuring modulation. Balancing of the servo system by the intermediate modulation signal provides a more precise indication of range on counter 47, and enables the servo to select the proper one of the several ambiguous range indicating phase differences of the fine range data modulation signal. Balance of the servo system by the fine channel results in an accurate numerical indication of range on indicator 47. Once control of the servo by the fine data signal is accomplished, in the manner disclosed hereinabove, the servo system will continue to track the range. However, if the fine channel loses control of the range servo, control thereof is switched to the intermediate channel automatically by switching circuit 134. When the error signal from intermediate range discriminator 136 becomes sufficiently small to again enable the fine data phase difference signal from discriminator 142 to regain control, switching circuit 134 connects servo motor 125 to discriminator 142 again.

In order to correct the parallax error in the fine range signal due to the asymetrical spacing of the transmitting and receiving antennas about the reference point at the intersection of base lines 11 and 12, range parallax correction computing servo 46 is employed. The signal received and detected by receiver 33 is mixed with a reference signal shifted in phase by an amount proportional to required parallax correction. The resultant signal is then supplied to discriminator 142 of range indicating servo 45.

Although a representative embodiment of this invention has been disclosed hereinabove, it will be apparent to one skilled in the art that many modifications and variations of the disclosed apparatus are contemplated. For example, other types of servo indicating systems may be employed herewith. For example, instead of the D.C. servo motor disclosed herein, an A.C. system of known type may be utilized. A suitable computer responsive to the range and direction cosine measurements supplied as a shaft rotation by the position indicating device of this invention may be employed to directly indicate the cartesian or polar coordinates of object 24 with respect to the reference point. It will be readily apparent that more or fewer grades of information may be employed, depending upon the accuracy required. Although the frequencies of the signals employed in the disclosed embodiment are presently preferred, other frequencies may be employed in practicing this invention, and consequently, other antenna spacings may be utilized.

While certain preferred embodiments of the invention have been specifically disclosed, it is understood that the invention is not limited thereto as many variations will be readily apparent to those skilled in the art and the invention is to be given its broadest possible interpretation within the terms of the following claims:

We claim:

1. Apparatus for determining the position of an object in space by measuring the phase difference due to the difference in distance traversed by a wave transmitted from said object to each of a plurality of spaced points comprising wave transmitting means carried by said object, have receiving means including a first antenna, a second antenna spaced from said first antenna, thereby establishing a base line, receiving means responsive to said first and second antennas for producing a signal representing the direction cosine of said object with respect to said base line in accordance with the difference in phase between the wave received at said first antenna and the wave received at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, and indicating means responsive to said phase comparison means for indicating the direction cosine of said object with respect to said base line.

2. Apparatus for determining the position of an object in space by measuring the phase difference due to the difference in distance traversed by a wave transmitted from said object to each of a plurality of spaced points comprising a transmitter, a transponder carried by said object responsive to said transmitter, first receiving means responsive to said transponder including a first antenna, a second antenna spaced from said first antenna, thereby establishing a base line, and a receiver responsive to said first and second antennas for producing a signal representing the direction cosine of said object with respect to said base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, indicating means connected to said phase comparison means for indicating the direction cosine of said object with respect to said base line, modulating means for applying a modulating signal to said transmitter, second receiving means responsive to said transponder for detecting the received modulation signal, a servo responsive to said modulating means and said second receiving means for comparing the phase delay of said received modulation signal and said transmitted modulating signal, and indicating means responsive to said servo for providing an indication of the range of said object.

3. Apparatus for determining the position of an object in space by measuring the phase difference due to the difference in distance traversed by a wave transmitted from said object to each of a plurality of spaced points, comprising a transmitter, a transponder carried by said object responsive to said transmitter, first receiving means responsive to said transponder including a first antenna, a second antenna spaced from said first antenna, thereby establishing a base line, and a first receiver responsive to said first and second antennas for producing a signal representing the direction cosine of said object with respect to said base base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, indicating means connected to said phase comparison means for indicating the direction cosine of said object with respect to said base line, range measuring equipment including a modulator for applying a modulating signal to said transmitter, a second receiver responsive to said transponder for detecting a received modulation signal, and means responsive to said modulating signal and to said second receiver for deriving an indication of the range of said object.

4. Apparatus for determining the position of an object in space by measuring the phase difference due to the difference in distance traversed by a wave transmitted from said object to each of a plurality of spaced points comprising wave transmitting means carried by said object, first wave receiving means including a first antenna, a second antenna spaced a plurality of wave lengths from said first antenna thereby establishing a base line, and a first receiver responsive to said first and second antennas for producing a first signal representing an ambiguous direction cosine of said object with respect to said base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, second wave receiving means including a direction finder antenna and a second receiver for producing a second signal representing the direction of said object, a servo responsive to said first signal and to said second signal wherein the ambiguous direction cosine represented by said first signal is resolved by said second signal, and indicating means responsive to said servo for indicating the true direction cosine of said object with respect to said base line.

5. Apparatus for determining the position of an object in space by measuring the phase difference due to the difference in distance traversed by a wave transmitted from said object to each of a plurality of spaced points comprising wave transmitting means carried by said object, first wave receiving means including a first antenna, a second antenna spaced from said first antenna, thereby establishing a first base line, and a first receiver responsive to said first and second antennas for producing a first signal representing the direction cosine of said object with respect to said first base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, first indicating means connected to said first phase comparison means for indicating the direction cosine of said object with respect to said first base line, second wave receiving means including a third antenna, a fourth antenna spaced from said third antenna thereby establishing a second base line, and a second receiver responsive to said third and fourth antennas for producing a second signal representing the direction cosine of said object with respect to said second base line in accordance with the difference in phase between the wave received at said third antenna and said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, and second indicating means connected to said second phase comparison means for indicating the direction cosine of said object with respect to said second base line.

6. Apparatus for determining the position of an object in space by measuring the phase difference due to the difference in distance traversed by a wave transmitted from said object to each of a plurality of spaced points comprising wave transmitting means carried by said object, first wave receiving means including a first antenna, a second antenna spaced a plurality of wave lengths from said first antenna, thereby establishing a base line, a third antenna on said base line spaced a greater plurality of wave lengths from said second antenna, a first receiver responsive to said first and second antennas for producing a first signal representing the ambiguous direction cosine of said object with respect to said base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer, and a first difference frequency reference signal, first detecting means connected to said first and second mixers, and first phase comparison means connected to said first detecting means and to said signal generator first difference frequency, and a second receiver responsive to said first and third antennas for producing a second signal representing said direction cosine more accurately but more ambiguously in accordance with the difference in phase between the wave received at said first antenna and said third antenna, said second receiver including said first mixer and a third mixer connected to said first and third antennas respectively, said local signal generator providing said first frequency signal to said first mixer, a third frequency signal to said third mixer, and a second difference frequency signal, second detecting means connected to said first and third mixers, and second phase comparison means connected to said second detecting means and to said signal generator second difference frequency, second wave receiving means including a direction finder antenna and a third receiver for producing a third signal representing the direction of said object, a servo responsive to said first signal, to said second signal, and to said third signal, wherein the ambiguous direction cosine represented by said first signal is resolved by said third signal, and the accurate ambiguous direction cosine represented by said second signal is resolved by the ambiguity resolved first signal, and indicating means responsive to said servo for indicating the accurate direction cosine of said object with respect to said base line.

7. Apparatus for determining the position of an object in space by measuring the phase difference due to the difference in distance traversed by a wave transmitted from said object to each of a plurality of spaced points comprising wave transmitting means carried by said object, first wave receiving means including a first antenna, a second antenna spaced a plurality of wave lengths from said first antenna, thereby establishing a first base line, and a first receiver responsive to said first and second antennas for producing a first signal representing an ambiguous direction cosine of said object with respect to said first base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, second wave receiving means including a third antenna, a fourth antenna spaced a plurality of wave lengths from said third antenna and thereby establishing a second base line, and a second receiver responsive to said third and fourth antennas for producing a second signal representing an ambiguous direction cosine of said object with respect to said second base line in accordance with the difference in phase between the wave received at said third antenna and at said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, third wave receiving means including a direction finder antenna and a third receiver for producing a third signal representing the direction of said object, a first servo responsive to said first signal and to said third signal wherein the ambiguous direction cosine represented by said first signal is resolved by said third signal, first indicating means responsive to said first servo for indicating the true direction cosine of said object with respect to said first base line, a second servo responsive to said second signal and to said third signal wherein the ambiguous direction cosine represented by said second signal is resolved by said third signal, and second indicating means responsive to said second servo for indicating the true direction cosine of said object with respect to said second base line.

8. Apparatus for determining the range of an object in space comprising a ground transmitter, modulating means for modulating said transmitter with a first modulating signal having a wave length longer than the range of said object and with a second modulating signal having a wave length substantially shorter than the range of said object, a transponder carried by said object for receiving and retransmitting said modulating signals, a ground receiver responsive to said transponder for receiving said first modulating signal and said second modulating signal delayed by an amount proportional to the range of said object, a servo responsive to said modulating means and to said receiver, first and second phase shifters connected to said modulating means and responsive to said first and second modulating signals respectively, first and second phase detecting means connected to said receiver and said first and second phase shifters respectively and first and second servo motors connected to said first and second phase detectors respectively, and means interconnecting said first and second servo motors whereby the ambiguous range represented by the delay of said second signal is resolved by the range represented by the delay of said first signal, and indicating means responsive to said servo for indicating the true range of said object.

9. Apparatus for determining the range of an object in space comprising a ground transmitter, modulating means for modulating said transmitter with a first modulating signal having a wave length longer than the range of said object, with a second modulating signal having a wave length substantially shorter than the range of said object, and with a third modulating signal having a wave length substantially shorter than said second modulating signal, a transponder carried by said object for receiving and retransmitting said modulating signals, a ground receiver responsive to said transponder for receiving said modulating signals delayed by an amount proportional to the range of said object, a servo responsive to said modulating means and to said receiver, first, second and third phase shifters connected to said modulating means and responsive to said first, second and third modulating signals respectively, first, second and third phase detecting means connected to said receiver and said first, second and third phase shifters respectively, and first, second and third servo motors connected to said first, second and third phase detectors respectively, and means interconnecting said first, second and third servo motors whereby the ambiguous range represented by the delay of said second signal is resolved by the range represented by the delay of said first signal, and the accurate ambiguous range represented by said third signal is resolved by the ambiguity resolved second signal, and indicating means responsive to said servo for providing an indication of the accurate range of said object.

10. Apparatus for determining the position of an object in space by measuring the phase difference due to the difference in distance traversed by a wave transmitted from said object to each of a plurality of spaced points comprising a transmitter, a transponder carried by said object and responsive to said transmitter, first wave receiving means responsive to said transponder including a first antenna, a second antenna spaced a plurality of wave lengths from said first antenna, thereby establishing a base line, and a first receiver responsive to said first and second antennas for producing a first signal representing the ambiguous direction cosine of said object with respect to said base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, second wave receiving means including a direction finder antenna and a second receiver for producing a second signal representing the direction of said object, a servo responsive to said first signal and to said second signal wherein the ambiguous direction cosine represented by said first signal is resolved by said second signal, indicating means responsive to said servo for indicating the true direction cosine of said object with respect to said base line, range measuring equipment including a modulator for applying a modulating signal to said transmitter, a third receiver responsive to said transponder for detecting a received modulation signal, and means responsive to said modulating signal and to said received modulation signal for deriving an indication of the range of said object.

11. Apparatus for determining the position of an object in space by measuring the phase difference due to the difference in distance traversed by a wave transmitted from said object to each of a plurality of spaced points comprising a transmitter, a transponder carried by said object responsive to said transmitter, first wave receiving means responsive to said transponder including a first antenna, a second antenna spaced a plurality of wave lengths from said first antenna, thereby establishing a base line, and a first receiver responsive to said first and second antennas for producing a first signal representing the ambiguous direction cosine of said object with respect to said base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer, and a difference frequency reference signal, detecting means connected to said mixers, and phase comparison means connected to said detecting means and to said signal generator difference frequency, second wave receiving means including a direction finder antenna and a second receiver for producing a second signal representing the direction of said object, a first servo responsive to said first signal and to said second signal wherein the ambiguous direction cosine represented by said first signal is resolved by said second signal, indicating means responsive to said first servo for indicating the true direction cosine of said object with respect to said base line, range measuring equipment including a modulator for applying a modulating signal to said transmitter, a third receiver responsive to said transponder for detecting a received modulation signal, a second servo responsive to said modulating means and to said third receiving means for comparing the phase delay of said received modulation signal and said transmitted modulating signal, and indicating means responsive to said second servo for providing an indication of the range of said object.

12. Apparatus for determining the position of an object in space by measuring the phase difference due to the difference in distance traversed by a wave transmitted from the object to each of a plurality of spaced points, comprising a transmitter, a transponder carried by said object responsive to said transmitter, first wave receiving means including a first antenna, a second antenna spaced from said first antenna, thereby establishing a first base line, and a first receiver responsive to said first and second antennas for producing a signal representing the direction cosine of said object with respect to said first base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, first indicating means for indicating the direction cosine of said object with respect to said first base line, second wave receiving means including a third antenna, a fourth antenna spaced from said third antenna thereby establishing a second base line, and a second receiver responsive to said third and fourth antennas for producing a signal representing the direction cosine of said object with respect to said second base line in accordance with the difference in phase between the wave received at said third antenna and said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, second indicating means for indicating the direction cosine of said object with respect to said second base line, range measuring equipment including a modulator for applying a modulating signal to said transmitter, a third receiver responsive to said transponder for detecting a received modulation signal, and means responsive to said modulating signal and to said received modulation signal for deriving an indication of the range of said object.

13. Apparatus for determining the position of an object in space by measuring the phase difference due to the difference in distance traversed by a wave transmitted from said object to each of a plurality of spaced points comprising a transmitter, a transponder carried by said object and responsive to said transmitter, first wave receiving means including a first antenna, a second antenna spaced from said first antenna, thereby establishing a first base line, and a first receiver responsive to said first and second antennas for producing a signal representing the direction cosine of said object with respect to said first base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, first indicating means for indicating the direction cosine of said object with respect to said first base line, second wave receiving means including a third antenna, a fourth antenna spaced from said third antenna and thereby establishing a second base line, and a second receiver responsive to said third and fourth antennas for producing a signal representing the direction cosine of said object with respect to said second base line in accordance with the difference in phase between the wave received at said third antenna and said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, second indicating means for indicating the direction cosine of said object with respect to said second base line, and range measuring means including a modulator for applying a modulating signal to said transmitter, a third receiver responsive to said transponder, for detecting the received modulation signal, a servo responsive to said modulator and to said third receiver for comparing the phase delay of said received modulation signal and said transmitted modulating signal, and third indicating means for providing an indication of the range of said object.

14. Apparatus for determining the position of an object in space by measuring the phase difference due to the difference in distance traversed by a wave transmitted from said object to each of a plurality of spaced points comprising a transmitter, a transponder carried by said object responsive to said transmitter, first wave receiving means including a first antenna, a second antenna spaced a plurality of wave lengths from said first antenna, thereby establishing a base line, a third antenna on said base line spaced a greater plurality of wave lengths from said second antenna, a first receiver responsive to said first and second antennas for producing a first signal representing the ambiguous direction cosine of said object with respect to said base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer, and a first difference frequency reference signal, first detecting means connected to said first and second mixers, and first phase comparison means connected to said first detecting means and to said signal generator first difference frequency, and a second receiver responsive to said first and third antennas for producing a second signal representing said direction cosine more accurately but more ambiguously in accordance with the difference in phase between the wave received at said first antenna and said third antenna, said second receiver including said first mixer and a third mixer connected to said first and third antennas respectively, said local signal generator providing said first frequency signal to said first mixer, a third frequency signal to said third mixer, and a second difference frequency signal, second detecting means connected to said first and third mixers, and second phase comparison means connected to said second detecting means and to said signal generator second difference frequency, second wave receiving means including a direction finder antenna and a third receiver for producing a third signal representing the direction of said object, a servo responsive to said first signal, to said second signal to said third signal, wherein the ambiguous direction cosine represented by said first signal is resolved by said third signal, and the accurate ambiguous direction cosine represented by said second signal is resolved by the ambiguity resolved first signal, indicating means responsive to said servo for indicating the accurate direction cosine of said object with respect to said base line, range measuring equipment including a modulator for applying a modulating signal to said transmitter, a fourth receiver responsive to said transponder for detecting a received modulation signal, and means responsive to said modulating signal and to said received modulation signal for deriving an indication of the range of said object.

15. Apparatus for determining the position of an object in space by measuring the phase difference due to the difference in distance traversed by a wave transmitted from said object to each of a plurality of spaced points comprising a transmitter, a transponder carried by said object and responsive to said transmitter, first receiving means including a first antenna, a second antenna spaced a plurality of wave lengths from said first antenna, thereby establishing a first base line, and a first receiver responsive to said first and second antennas for producing a first signal representing an ambiguous direction cosine of said object with respect to said first base line in accordance with the difference in phase between the wave received at said first antenna and at said second antenna, said first receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, second wave receiving means including a third antenna, a fourth antenna spaced a plurality of wave lengths from said third antenna and thereby establishing a second base line, and a second receiver responsive to said third and fourth antennas for producing a second signal representing an ambiguous direction cosine of said object with respect to said second base line in accordance with the difference in phase between the wave received at said third antenna and at said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, third wave receiving means including a direction finder antenna and a third receiver for producing a third signal representing the direction of said object, a first servo responsive to said first signal and to said third signal wherein the ambiguous direction cosine represented by said first signal is resolved by said third signal, first indicating means responsive to said first servo for indicating the true direction cosine of said object with respect to said first base line, a second servo responsive to said second signal and to said third signal wherein the ambiguous direction cosine represented by said second signal is resolved by said third signal, second indicating means responsive to said second servo for indicating the true direction cosine of said object with respect to said second base line, range measuring equipment including a modulator for applying a modulating signal to said transmitter, a fourth receiver responsive to said transponder for detecting a received modulation signal, and means responsive to said modulating signal and to said received modulation signal for deriving an indication of the range of said object.

16. Apparatus for determining the position of an object in space by measuring the phase difference due to the difference in distance traversed by a wave transmitted from said object to each of a plurality of spaced points comprising a transmitter, a transponder responsive to said transmitter and carried by said object, first receiving means including a first antenna, a second antenna spaced a plurality of wave lengths from said first antenna, thereby establishing a first base line, and a first receiver responsive to said first and second antennas for producing a first signal representing an ambiguous direction cosine of said object with respect to said first base line in accordance with the difference in phase between the wave received at said first antenna and at said second antenna, said receiver including first and second mixers connected to said first and second antennas respectively, a local signal generator providing a first frequency signal to said first mixer, a second frequency signal to said second mixer and a difference frequency reference signal, first detecting means connected to said first and second mixers, and first phase comparison means connected to said first detecting means and to said signal generator difference frequency, second wave receiving means including a third antenna, a fourth antenna spaced a plurality of wave lengths from said third antenna along a perpendicular bisector of said first base line, thereby establishing a second base line perpendicular to said first base line, and a second receiver responsive to said third and fourth antennas for producing a second signal representing an ambiguous direction cosine of said object with respect to said second base line in accordance with the difference in phase between the wave received at said third antenna and at said fourth antenna, said second receiver including third and fourth mixers connected to said third and fourth antennas respectively, and to said local signal generator, second detecting means connected to said third and fourth mixers, and second phase comparison means connected to said second detecting means and to said signal generator difference frequency, third wave receiving means including a direction finder antenna at the intersection of said first and second base lines, and a third receiver for producing a third signal representing the direction of said object, a first servo responsive to said first signal and to said third signal wherein the ambiguous direction cosine represented by said first signal is resolved by said third signal, first indicating means responsive to said first servo for indicating the true direction cosine of said object with respect to said first base line, a second servo responsive to said second signal and to said third signal wherein the ambiguous direction cosine represented by said second signal is resolved by said third signal, second indicating means responsive to said second servo for indicating the true direction cosine of said object with respect to said second base line, range measuring equipment including a modulator for applying a modulating signal to said transmitter, a fourth receiver responsive to said first antenna for detecting a received modulation signal, and means responsive to said modulating signal and to said received modulation signal for deriving an indication of range of said object.

17. Apparatus for determining the position of an object in space by measuring the phase difference due to the difference in distance traversed by a wave transmitted from said object to each of a plurality of spaced points comprising a transmitter, a transponder carried by said object responsive to said transmitter, first wave receiving means responsive to said transponder including a first antenna, a second antenna spaced a plurality of wave lengths from said first antenna, thereby establishing a base line, a third antenna on said base line spaced a greater plurality of wave lengths from said second antenna, a first receiver responsive to said first and second antennas for producing a first signal having a phase shift representing the ambiguous direction cosine of said object with respect to said base line in accordance with the difference in phase between the wave received at said first antenna and at said second antenna, and a second receiver responsive to said first and third antennas for producing a second signal having a phase shift representing said direction cosine more accurately but more ambiguously in accordance with the difference in phase between the wave received at said first antenna and said third antenna, second wave receiving means including a direction finder antenna and a third receiver for producing a third signal representing the direction of said object, a first servo responsive to said first signal, to said second signal, and to said third signal wherein the ambiguous direction cosine represented by said first signal is resolved by said third signal and the accurate ambiguous direction cosine represented by said second signal is resolved by the ambiguity resolved first signal, indicating means responsive to said first servo for indicating the accurate direction cosine of said object with respect to said base line, a modulator for applying a modulating signal to said transmitter, third wave receiving means responsive to said transponder for detecting the received modulation signal, a second servo responsive to said modulating signal and to said third receiving means for comparing the phase delay of said received modulation signal with respect to said transmitted modulating signal, and indicating means responsive to said second servo for providing an indication of the range of said object.

18. Apparatus for determining the position of an object in space by measuring the phase difference due to the difference in distance traversed by a wave transmitted from said object to each of a plurality of spaced points comprising a transmitter, a transponder carried by said object responsive to said transmitter, first wave receiving means including a first antenna, a second antenna spaced a plurality of wave lengths from said first antenna, thereby establishing a base line, a first receiver responsive to said first and second antennas for producing a first signal having a phase shift representing an ambiguous direction cosine of said object with respect to said first base line in accordance with the difference in phase between the wave received at said first antenna and at said second antenna, second wave receiving means including a third antenna, a fourth antenna spaced a plurality of wave lengths from said third antenna thereby establishing a second base line, and a second receiver responsive to said third and fourth antennas for producing a second signal having a phase shift representing an ambiguous direction cosine of said object with respect to said second base line in accordance with the difference in phase between the wave received at said third antenna and at said fourth antenna, third wave receiving means including a direction finder antenna and a third receiver for producing a third signal representing the direction of said object, a first servo responsive to said first signal and to said third signal wherein the ambiguous direction cosine represented by said first signal is resolved by said third signal, first indicating means responsive to said first servo for indicating the true direction cosine of said object with respect to said first base line, a second servo responsive to said second signal and to said third signal wherein the ambiguous direction cosine represented by said second signal is resolved by said third signal, second indicating means responsive to said second servo for indicating the true direction cosine of said object with respect to said second base line, modulating means for applying a modulating signal to said transmitter, fourth wave receiving means responsive to said transponder for detecting a received modulation signal, a third servo responsive to said modulating means and said fourth receiving means for comparing the phase delay of said received modulation signal with respect to said modulating signal, and third indicating means responsive to said third servo for providing an indication of the range of said object.

References Cited in the file of this patent
UNITED STATES PATENTS

| | | |
|---|---|---|
| 1,406,996 | Morrill | Feb. 21, 1922 |
| 2,198,113 | Holmes | Apr. 23, 1940 |
| 2,248,727 | Strobel | July 8, 1941 |
| 2,406,953 | Lewis | Sept. 3, 1946 |
| 2,413,637 | Loughlin | Dec. 31, 1946 |
| 2,472,129 | Streeter | June 7, 1949 |
| 2,581,438 | Palmer | Jan. 8, 1952 |
| 2,608,685 | Hastings | Aug. 26, 1952 |

UNITED STATES PATENT OFFICE
CERTIFICATE OF CORRECTION

Patent No. 3,025,520                            March 13, 1962

Robert V. Werner et al.

It is hereby certified that error appears in the above numbered patent requiring correction and that the said Letters Patent should read as corrected below.

Column 3, line 49, for "point." read -- point P. --; line 75, for "rang" read -- range --; column 4, lines 43 to 48, equation (8) should appear as shown below instead of as in the patent:

$$\frac{S_1-S_2}{e+f}=\cos\delta+\frac{e-f}{2r}(1-\cos^2\delta)-\frac{(e^3+f^3)(1-\cos^2\delta)(\cos\delta)}{(e+f)\;2r^2}+\ldots$$

column 5, lines 1 and 2, after "difference" insert -- $\phi$ --; line 35, for "refernce" read -- reference --; column 6, line 1, and column 7, line 52, for "cosin", each occurrence, read -- cosine --; column 20, line 59, for "have" read -- wave --; column 22, line 1, strike out "base".

Signed and sealed this 3rd day of July 1962.

(SEAL)
Attest:
ERNEST W. SWIDER
Attesting Officer

DAVID L. LADD
Commissioner of Patents

UNITED STATES PATENT OFFICE
CERTIFICATE OF CORRECTION

Patent No. 3,025,520                     March 13, 1962

Robert V. Werner et al.

It is hereby certified that error appears in the above numbered patent requiring correction and that the said Letters Patent should read as corrected below.

Column 3, line 49, for "point." read -- point P. --; line 75, for "rang" read -- range --; column 4, lines 43 to 48, equation (8) should appear as shown below instead of as in the patent:

$$\frac{S_1-S_2}{e+f} = \cos \delta + \frac{e-f}{2r}(1-\cos^2\delta) - \frac{(e^3+f^3)(1-\cos^2\delta)(\cos \delta)}{(e+f) \quad 2r^2} + \ldots$$

column 5, lines 1 and 2, after "difference" insert -- $\phi$ --; line 35, for "refernce" read -- reference --; column 6, line 1, and column 7, line 52, for "cosin", each occurrence, read -- cosine --; column 20, line 59, for "have" read -- wave --; column 22, line 1, strike out "base".

Signed and sealed this 3rd day of July 1962.

(SEAL)
Attest:
ERNEST W. SWIDER
Attesting Officer

DAVID L. LADD
Commissioner of Patents